United States Patent [19]
Lamden

[11] 3,898,625
[45] Aug. 5, 1975

[54] ANALOGUE RECURSIVE PROCESS CONTROL SYSTEM

[76] Inventor: Ralph James Lamden, 7 Weald Rise, Tilehurst, Reading, England

[22] Filed: June 14, 1973

[21] Appl. No.: 370,006

Related U.S. Application Data

[63] Continuation-in-part of Ser. No. 91,464, Nov. 20, 1970, abandoned.

[30] Foreign Application Priority Data

Nov. 20, 1969 United Kingdom........... 56774/69
Apr. 18, 1970 United Kingdom........... 18634/70

[52] U.S. Cl. ............................................. 340/172.5
[51] Int. Cl. ............................................. G06f 3/05
[58] Field of Search................ 340/172.5; 235/150.5

[56] References Cited
UNITED STATES PATENTS

| | | | |
|---|---|---|---|
| 3,185,821 | 5/1965 | Lee et al...................... | 340/172.5 X |
| 3,243,582 | 3/1966 | Holst........................... | 340/172.5 X |
| 3,435,422 | 5/1969 | Gerhardt et al. ................ | 340/172.5 |
| 3,555,514 | 1/1971 | Hosaka et al. .................. | 340/172.5 |
| 3,610,896 | 10/1971 | Heid ............................ | 340/172.5 X |

*Primary Examiner*—Harvey E. Springborn

[57] ABSTRACT

A combined analogue/digital computer in which analogue functions of slowly varying analogue input signals are computed and stored as analogue output signals under the control of a digital programme memory. The selection of the input signals, selection of the function and selection of a store for each analogue output signal is controlled by a digital instruction word, and a clock defines time slots each assigned to a respective instruction word and during which time each analogue input may be considered to be constant. A conditional programme branch facility is provided. A variable gain amplifier and a multiplying device are used for the analogue functions. Output stores include "sample-and-hold" stores, integrating stores and a "maximum value" store. Selectable circulating paths are digitally controlled to recirculate outputs back to inputs.

7 Claims, 8 Drawing Figures

STORE SELECTION SWITCHES

FIG. 8.

ANALOGUE RECURSIVE PROCESS CONTROL SYSTEM

This application is a continuation in part of my copending application Ser. No. 91,464 filed on Nov. 20, 1970 which is now abandoned.

BACKGROUND

The control of processes is always effected by some control computational scheme. In early controllers of algorithm consisted simply in the matching of demand and response, with provisions of stability, but the increasing complexity of modern engineering systems has required increasingly complicated computational schemes. A good example of this has occurred in the field of aircraft gas turbine control. Early single spool turbines consisting of a single compressor and turbine, were controlled by a scheme which produced a nearly linear relationship between pilot's lever position and thrust, modified by limiters on rotational speed and jet pipe temperature. The need to make engines work safely over a greater range of heights and speeds, with greater fuel economy, has necessitated increasingly complicated control schemes.

With all flying computers used up to the present, the computation is carried out in analogue quantities, electrically in the case of the Concorde although hydraulic computation is used in other aircraft.

A major drawback in analogue schemes is their relative inflexibility. The development of a new engine may require large and frequent changes to the control algorithm which will require considerable circuit redesign. For this reason some attention is currently being given to the use of digital computers for engine control. The use of a stored programme offers an almost infinite flexibility. Against this must be set the need for input and output conversion to and from the digital form, and the relative slowness of digital data transfers. The cost of the additional complexity is simply not financial. For aircraft use, safety is a prime consideration, and an increased number of components must imply a greater failure probability.

The need for a new range of aircraft control equipment led to an assessment of the comparative advantages of analogue and digital control schemes. It became apparent that while the use of controllers working in the analogue mode was becoming inconvenient because of the time taken for programme modification, the use of digital computers is made difficult by their complexity and by the relatively long cycle time for a control computation. Some study was given to conventional hybrid computers, but it became apparent that these combine the lack of flexibility of a wired programme analogue computer with the complexity associated with analogue to digital, and digital to analogue conversion. One outstanding fact was the high speed of the purely analogue computer. Even quite conventional operational amplifiers have bandwidths which are several orders of magnitude greater than is necessary for the control of most mechanical devices. Indeed this excess bandwidth is usually an embarrassment requiring the provision of bandwidth limiting circuits.

SUMMARY

The invention is based on an appreciation by the inventor that a single operational amplifier assembly might have enough bandwidth to enable it to carry out all the computations involved in a complex control loop serially. This makes a clearcut division between the programme processes, which is entirely digital, and the arithmetic processes which takes place entirely in the analogue mode under the serial control of the programme. Such a scheme does not fit easily under the usual difinition of a hybrid computer, and it has been called by the inventor, an Analogue Recursive Computer. The term recursive has been introduced to emphasize the discontinuous way in which analogue variables are computed in time slots during which their value may be considered to be substantially constant and fed to the (analogue) output stores.

It is an object of the invention to provide a computation system in which the advantages of speed of computation of an analogue computer are combined with the advantages of program flexibility of a digital computer.

It is another object of the invention to provide a computation system using fast analogue computation and flexible digital programming in which time-consuming conversion of analogue values to digital signals and/or vice versa is avoided.

It is another object of the invention to provide a computation system fast enough for control of complex engineering systems such as gas turbine engines and flexible enough for program modifications to be made readily when modifications are made to the controlled system.

One application of the invention is to a computation system forming part of a gas turbine engine control system.

According to the present invention there is provided a computational system comprising a digital memory for storing a program which is made up of a number of digital instruction words, the digital memory having an input address line for each instruction word and an output line for each bit of the "instruction word"; a control means for successively addressing the input lines of the memory for causing successive instruction words each to appear on the output lines for a short time period whose duration is determined by the control means; a plurality of inputs for receiving respective slowly varying analogue input signals whose values are substantially constant during the aforementioned short time period; an input signal selection means connected to some of said output lines and responsive to a signal selection determining digital command forming part of the instruction word on said output lines to select one of the input signals for a said time period; an analogue computing means connected to selected of said output lines and responsive to a function determining digital command signal forming part of the instruction word on said lines to produce an analogue output signal which is a selected analogue function to the input signal, said computing means operating on a substantially constant single-valued quantity for the duration of the aforementioned short time period; a plurality of stores for storing single-valued quantities, which stores are selectively connectible to the output of said analogue computing means; store selection means connected to selected of said output lines and responsive to a selection determining digital command signal forming part of the instruction word on said output lines to select one of said stores during the aforementioned short time period, the substantially constant analogue output of the computing means being applied to said selected store during the aforementioned short time period, and at least one closed loop path from the output side of one of said stores, to one of said inputs.

The invention will be described by way of example with reference to the accompanying drawings.

Figure 1:
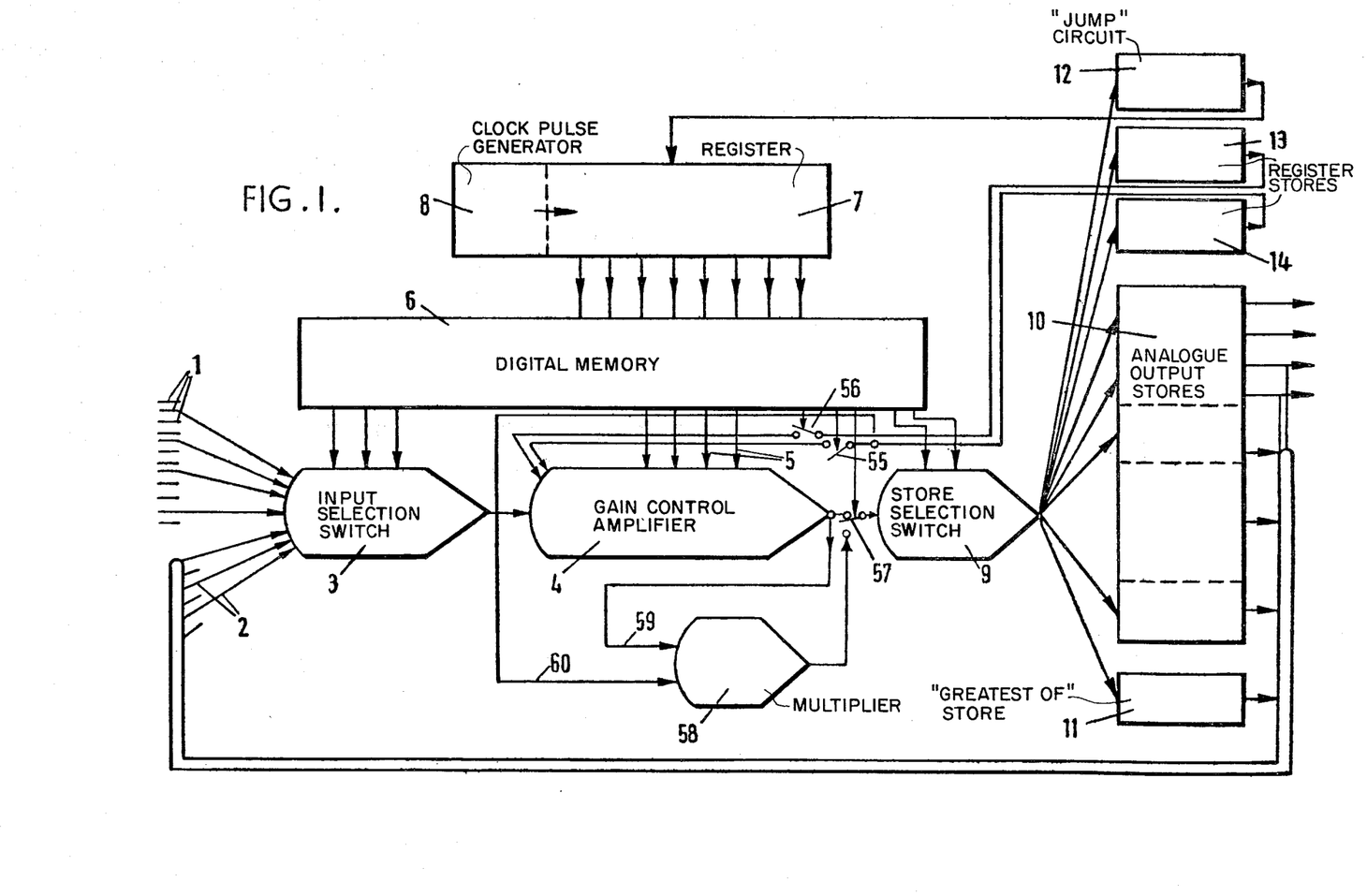
FIG. 1 is a block diagram of a computation system in accordance with the invention.

The computation system shown in FIG. 1 has a plurality of inputs, e.g. 32, for receiving respective slowly varying analogue input signals. The input signals may be from sensors in, for example, a turbine engine.

The first input is however always connected to earth, whilst the second input is always connected to a reference potential of one volt, as reference voltages for test purposes. Six more of the inputs 1 are connected by paths 2 respectively to the six integrating output stores, some more are connected to certain others of the output stores, whilst another input 1 is connected by a path 2 to the maximization store 11.

The inputs are connected to an input selection switch 3 which is responsive to a digital command signal, (referred to hereinafter as an input address) from a digital memory 6 to select one of the input signals.

The selection switch 3 comprises a number of M.O.S.T. (Metal Oxide Silicon Transistors) analogue switches. The number of switches is equal to the number of inputs and these are controlled by the input selection signal. Such selection switches are obtainable as single components in M.S.I. (medium scale integrated) from semiconductor manufacturers.

The output of the input selection is connected to an input of a gain controlled amplifier 4 forming part of an analogue computing means, the gain of the amplifier 4 (and whether the output is inverted or not) being determined by another digital command signal which is applied to the amplifier 4 through paths 5 from the digital memory 6. The gain controlled amplifier 4 will be described in more detail with reference to FIG. 3.

The output of the amplifier 4 is connected through a switch 57 to a store selection switch 9 responsive to another digital command signal. The selection switch 9 is similar to the switch 3 and comprises M.O.S.T. analogue switches in integrated circuit form. In response to the command signal, the store selection switch connects the output of the amplifier 4 to a selected one of a plurality of stores 10 (e.g. 29), a store 11, register 13 or 14, and a "jump" circuit 12 which will be described in more detail with reference to FIG. 5. The input and store selection switches 3 and 9 may be of the type disclosed in U.S. Pat. No. 3,330,943, filed Nov. 26, 1963. Six of the stores 10 are integrating stores. The six integrating stores differ from the others of the stores 10 and the stores 13 and 14 in that it is possible to apply an input to an integrating store while at the same time selecting the output thereof for connection to the amplifier 4 through switch 3.

The stores 10 store single-valued analogue quantities and comprise one capacitor for each analogue quantity stored. The six integrating stores comprise conventional analogue integrators. Each integrating store comprises an operational amplifier with capacitive feedback having a resistor connected to its input.

Figure 7:
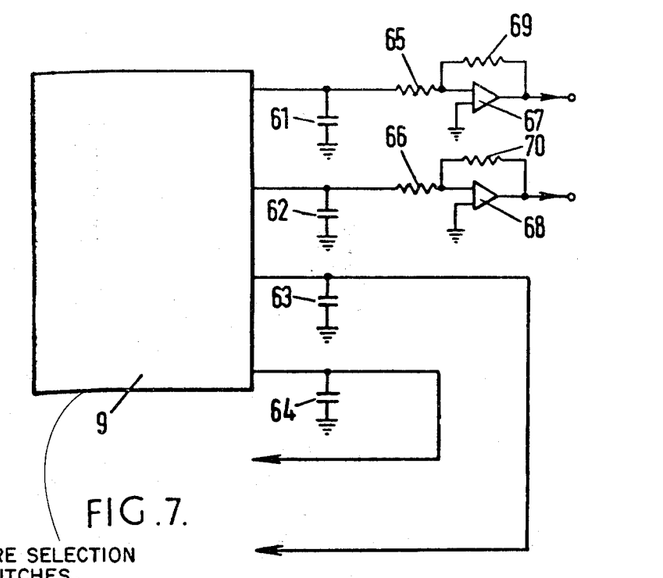
FIG. 7 is a diagram illustrating analogue store used in the system.

The stores 10 are shown in more detail in FIG. 7. The outputs of the store selection switch 9 are connected to first terminals of respective capacitors 61, 62, 63 and 64. The second terminals of the capacitors are connected to earth. The first terminals of capacitors 61 and 62 are connected through respective resistors 65 and 66 to buffer amplifiers 67 and 68, the outputs of which are connected to the output terminals of the device. One input terminal of each of the buffer amplifiers 67 and 68 is earthed and feedback resistors 69 and 70 are provided.

The stores 10 which only include the capacitors 63 and 64 are the recirculating stores and these do not include a buffer amplifier and are connected directly back to the input selection switch 3.

Figure 8:
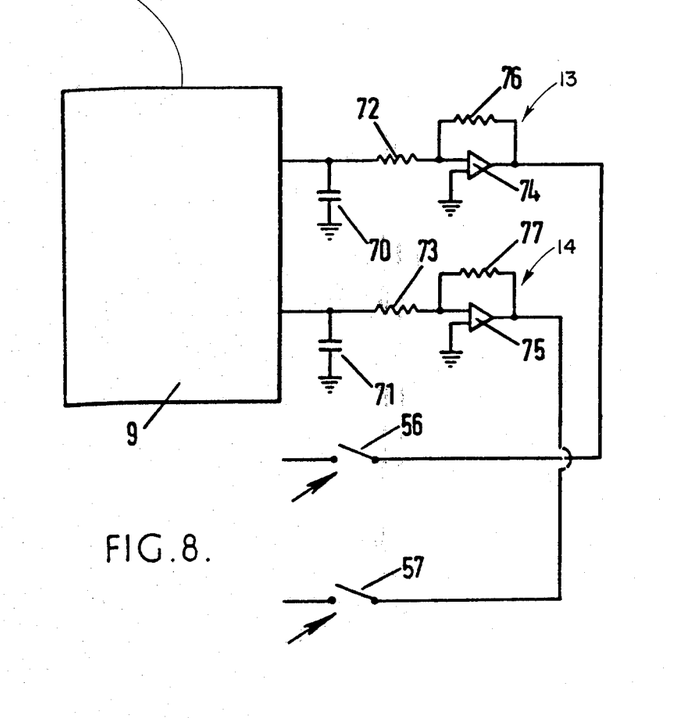
FIG. 8 is a diagram showing a further kind of analogue store used in the system.

The stores which in FIG. 1 are referenced 13 and 14 are shown in more detail in FIG. 8. These are similar to the stores of type 10 including buffer amplifiers and have capacitors 70 and 71 having first terminals connected to respective outputs of the store selection switch 9 and second terminals connected to earth. The first terminals are connected through resistors 72 and 73 to buffer amplifiers 74 and 75 whose outputs are connected to the switches 56 and 57. One terminal of each of the buffer amplifiers 74 and 75 is connected to earth. Feedback resistors 76 and 77 are also provided.

The outputs of the stores 10 form the output of the system and may be used to control for example valve settings in a turbine engine. Some of the outputs of the stores 10 are connected through circulating paths 2 to selected of the inputs 1 to enable the outputs to be reprocessed by the system.

The store 11 is a "greatest of store" which is described in more detail with reference to FIG. 4. The store 11 stores whichever of a plurality of signals applied to it is the greatest.

The register 14 is also connected to one input 60 of an analogue multiplier 58 which has another input 59 connected to the output of the amplifier 4. The output of the amplifier 58 is connected through a switch 57 to the store selection switch 9. The multiplier 58 is a conventional analogue "transconductance multiplier" which depends for its operation on the variation of transistor transductance with collector current. The switches 55, 56, 57 are also M.O.S..T. analogue switches responsive to digital command signals.

The input selection switch 3, the amplifier 4, the switches 55, 56, 57 and the store selection switch are controlled by digital command signals from the memory 6. The memory 6 comprises a Read Only Memory (R.O.M.) available from manufacturers as an integrated unit. The Read Only Memory is provided by three Intel 1301 type ROMs which together provide a 256 word-24 bit memory. The Read Only Memory 6 has a program stored therein for producing the digital command signals. The program is preset in accordance with the task the system is to perform. In the case of a turbine engine the program is set up according to the manufacturers requirements for the dependency of for example the fuel comsumption on engine speed and temperature.

Figure 2:
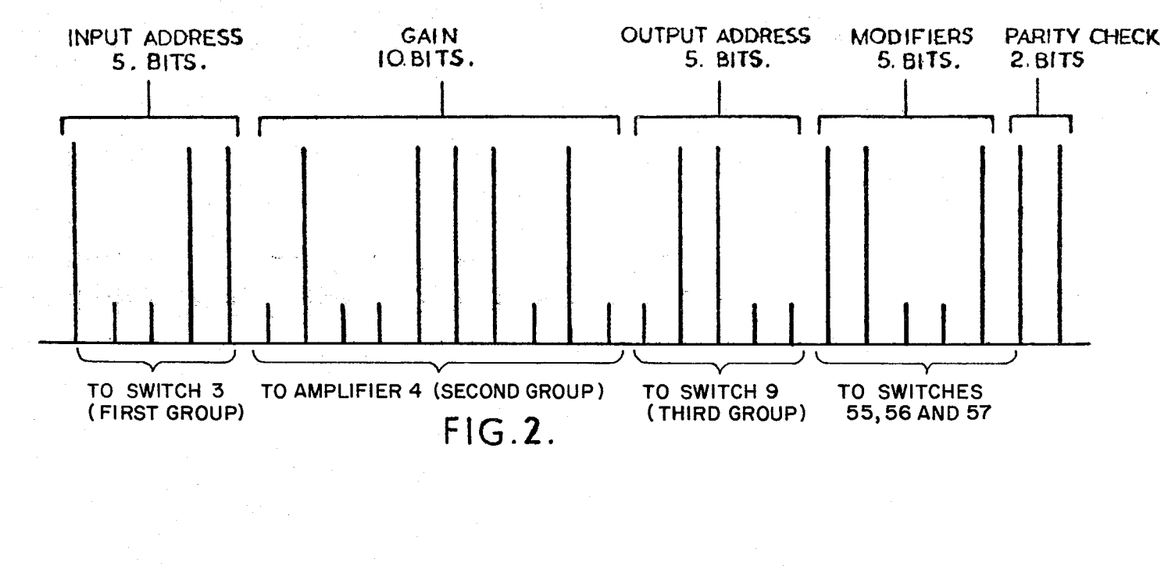
FIG. 2 illustrates a typical instruction word from the digital memory means of the computation system.

The data output of the memory 6 is directly connected to the various switches and the amplifier in accordance with the distribution shown in FIG. 2. Five output lines representing the five bit input address are connected to the switch 3. Ten output lines representing the ten bit gain control command signal are connected to the amplifier 4. Five lines are connected to the switch 9 and from the five bit output address. Five lines form modifiers. The first and second modifier bits control the switch 56 and 55 respectively to cause the output of register 13 or 14 to be applied to the amplifier 4 and added to a selected input 1. The third modifier bit controls inversion or non-inversion by the amplifier 4, whilst the fourth modifier bit (at unity) sets the maximization store 11 to minimum voltage for the start of maximization in succeeding time slots. The fifth modifier bit controls switch 57 to carry output multiplication. Two output lines of the memory 6 are connected to a two bit parity checking circuit (not shown). The two parity bits are used for "add" and "even" bits of the word forming the digital command signals.

The address lines of the Read Only Memory 6 are connected to a register 7 which in in turn connected to a conventional clock pulse generator 8 provided by an oscillator operating at 100 KHz. The register 7 is a ripple-through counter comprising eight flip-flops as digital integrated circuits and having eight output lines. The register 7 counts successively through the clock pulses from 0 to 256, the number of clock pulses counted being represented in binary form on the eight output lines. The Read Only Memory 6, available in integrated circuitry, is responsive to an address given directly in binary code.

The operation of the system will now be described. When the register 7 counts the first clock pulse it outputs a number 00000001 which addresses one of the input lines of the Read Only Memory 6. The number or address stays on the output lines of the register 7 until the next clock pulse is counted and this time is the time for which the given lines of the memory 6 is addressed. This time therefore also represents the time for which an instruction word corresponding to the given output address of the memory 6 appears at its output and is therefore a "time-slot" during which a single analogue computation takes place. The computer is in fact operated at a rate of 10 microseconds per instruction. This period is divided into two by strobe voltages obtained from a binary scaler stage (not shown).

The purpose of the strobe is to disable, for the first half of the instruction period, those functions such as "greatest-of" (by store 11) and "jump" (by circuit 12), which makes a logical decision depending on the value of a voltage. The strobe allows time for all switching transients associated with a new instruction to die away before the decision is made. The instruction word sets up the switches and amplifies in accordance with the program in the memory 6, the bits of the word being allocated as described with reference to FIG. 2.

When the register 7 counts the next successive clock pulse, the number 00000010 appears at the output of the register 7 and the next input address line of the memory 6 is addressed. This causes a further instruction word to be outputted by the memory 6 for a further time slot until the next clock pulse is counted. Each input of the memory 6 is addressed until the register 7 has counted to its maximum capacity, in this illustrative case 256, when the register 7 re-sets to 0 and the cycle starts again.

The inputs 1 receive slowly varying analogue quantities which for the period of one time slot (e.g. 10 μsec) may be considered to be substantially constant. The system therefore works in a manner analogous to a digital computer in that for the period of a time-slot the quantity be processed is considered single-valued and substantially constant. It is however unlike a digital computer represented in analogue form.

This single-valued analogue quantity is operated on by the gain controlled amplifier 4 under the control of the ten bit digital command signal forming part of the instruction word. The processed analogue quantity is then routed through the selection switch 9 to one of the stores 10, if it is merely required to perform one operation on the quantity by the amplifier 4.

If it is desired to further process the analogue quantity, the output of the amplifier 4 may be routed to the registers 13, 14. In this case the processed signal can be applied to one of two inputs of the amplifier 4 and another operation performed on it in another time slot. Alternatively the controls of the register 14 may be multiplied together with the output of the amplifier 4 in the analogue multiplier 58 whose output may be connected through the switch 57 to the store selection switch 9.

The system can be made to perform various operations by setting up the switches and the gain of the amplifier 4 according to command signals forming part of the instruction word for each time slot.

The functions of which the computation system is capable are set out in Table 1 as follows:

TABLE 1

| | |
|---|---|
| 1. Multiplication of a variable "$x$" by a constant "$a$" | $f_1 = ax$ ; |
| 2. Multiplication of two variables "$x_1$" and "$x_2$" | $f_2 = x_1 x_2$ ; |
| 3. Addition | $f_3 = x_1 + x_2$ ; |
| 4. Subtraction | $f_4 = x_1 - x_2$ ; |
| 5. Integration with respect to (w.r.t.) time | $f_5 = \int x dt$ ; |
| 6. Differentiation w.r.t. time | $f_6 = dx/dt$ — |
| 7. Maximization (or greatest of) | $f_7 = \max(x_1, x_2...x_n)$ |
| 8. Minimization (or least of) | $f_8 = \min(x_1, x_2...x_n)$ |
| 9. Programme branch (or "jump") | — |

The uses of most of these functions are obvious. The maximization and minimization functions are employed when a number of intersecting control loops are connected through the same actuator. For example in a gas turbine engine control system while the throttle position at low engine speeds may be controlled by a loop responsive to the position of the pilot's lever, at higher speeds limitation on engine temperature and on rotational speed may become effective through other loops. The actual value of the fuel flow may be defined as the least of the three positions computed by these loops.

Approximations to the integral and differential functions can be computed using stepwise approximation providing that the quantity is varying only small amounts within the "recursion time", that is, the time that elapses between corresponding time slots in which a given function or a given input is computed. The stability and accuracy of this approximation process can be found from conventional z transform analysis. An interesting distinction from the truly digital computation is the absence of errors due to round off.

The programme function is used to select the different computing algorithms, dependent on conditions external to the controller, using the jump circuit 12 to cause a conditional transfer to be made to an instruction other than the one occurring next within the programme.

The multiplication of a variable $x$ by a constant $a$, ($f_1 = ax$,) is effected by setting the gain of amplifier 4 to correspond to the constant $a$, selecting the required input $x$, and applying the output of amplifier 4 to a selected store, in a single time slot.

The multiplication of two variables $x_1$ and $x_2$, ($f_2 = x_1x_2$) is carried out in two time slots. In the first time slot, input $x_1$ is selected and is applied by amplifier 4 (with unity gain) and switch 9 to register 14. In the second time slot, the quantity $x_1$ is applied from register 14 through line 60 to multiplier 58, while input $x_2$ is selected by switch 3 and applied through amplifier 4, (with unity gain) and line 59 to multiplier 58, the output from which is supplied through switch 57, (operated to the other position from that shown), to switch 9, and thence to a selected store.

Addition of two variables $x_1$ and $x_2$, ($f_3 = x_1 + x_2$) is also carried out in two time slots. In the first time slot, $x_1$ is selected by switch 3 as input and is applied with unity gain to register 13 or 14. In the second time slot, $x_2$ is selected by switch 3 as input, while switch 56 or 55 closes to apply $x_1$ from register 13 or 14 respectively to amplifier 4 at the same time as $x_2$. The output is applied through switch 9 to a selected store. The gain of the amplifier 4 is arranged to be in unity for values from either of registers 13 and 14 input to the amplifiers 4.

Subtraction of two variables, ($f_4 = x_1$,) is carried out in a similar manner to addition, except that in the first time slot $x_2$ is selected by switch 3, inverted (to form $-x_2$) by amplifier 4 and applied to register 13 or 14, whilst $x_1$ is selected by switch 3 in the second time slot, amplifier 4 adding $x_1$ and $-x_2$ to provide $f_4 = x_1 - x_2$.

Integration w.r.t. time, ($f_5 = \int x \, dt$,) is effected by any one of the six integrating stores selected by switch 9.

The manner of differentiation, ($f_6 = dx/dt$,) has been explained above.

Maximization, ($f_7 = \max (x_1, x_2, \ldots x_n)$) is obtained by means of store 11, using one time slot for selection of each input $x_1, x_2, \ldots x_n$ in turn, with unity gain of amplifier 4, and applying the selected inputs one by one to store 11.

Minimization, ($f_8 = \min (x_1, x_2, \ldots x_n)$) is obtained by making use of the identity $\min (x_1, x_2, \ldots x_n) = - \max (-x_1, -x_2, \ldots -x_n)$. Each input $x_1, x_2, \ldots x_n$ is inverted and applied to a respective time slot to store 11, then finally the output from store 11 is circulated to a given input and inverted.

Programme branch is carried out by causing switch 9 to select the "jump" circuit 12. A detailed description of "jump" circuit 12 is given hereinafter. Briefly, however, if the input to the "jump" circuit 12 is zero or negative, the circuit is inoperative. If the input is positive, the circuit 12 causes the register 7 to "jump" a number of sets of instructions in the memory 6, on the next clock pulse, that is to say, for the next time slot.

Figure 3:
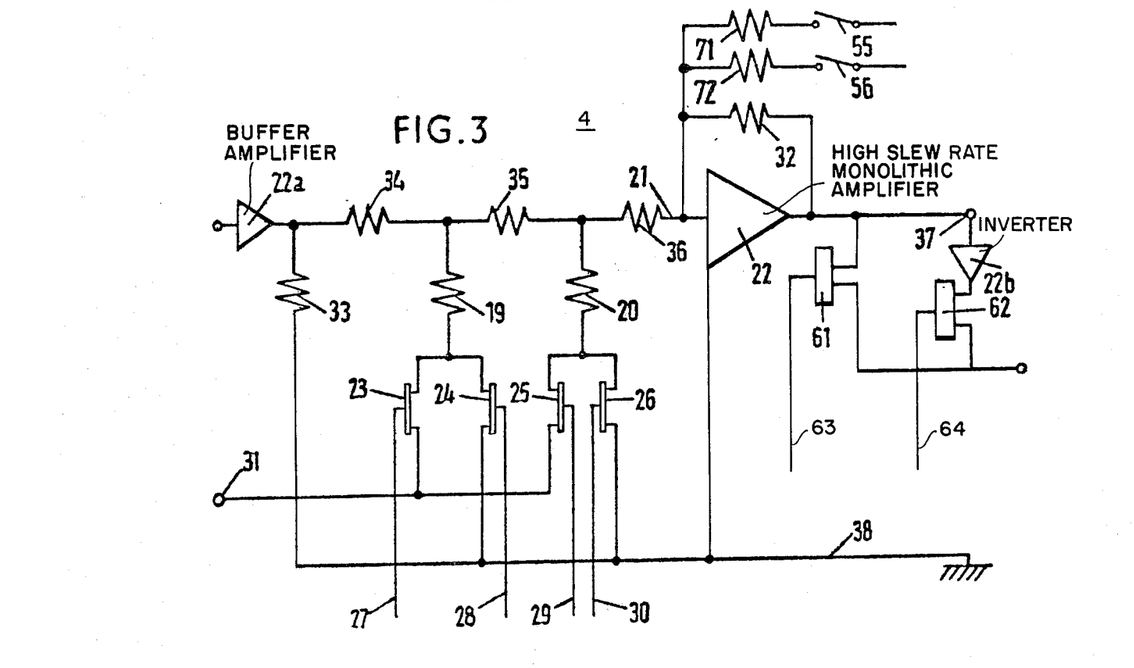
FIG. 3 is a block diagram of a variable gain amplifier in the system of FIG. 1.

The gain controlled amplifier 4 is illustrated in FIG. 3, and comprises a high slew rate monolithic amplifier 22, ten pairs of field effect transistors of which only transistors 23 to 26 are shown, ten pairs of inputs such as inputs 27 to 30, for gain-control digital command signals from memory 6, a ladder network of resistances such as resistances 19,20 and 33 to 36, a reference potential input terminal 31, negative feedback resistance 32, earth lead 38, and resistances 71,72 connected as shown. Each pair of transistors corresponds to a given order $n$ (= 0,1,...9,) the transistors 25 and 26 nearest amplifier 22 corresponding to the highest order $n = 9$, transistors 23 and 24 corresponding to the next highest order $n = 8$, and so on. Referring to each pair of transistors as a switch giving a value of $S_n$ of unity when the left-hand transistor alone conducts and of zero when the right-hand transistor alone conducts, the gain A of amplifier 4 is given by:

$A = k (S_0 2^0 + S_1 2^1 + S_2 2^2 = \ldots + S_9 2^9)$, where $k$ is a preset constant, made equal to 0.01 exactly, so that the gain is unity for the binary member 1100100 equivalent to one hundred, ($S_0, S_1, S_3$ and $S_4$ being zero and $S_2, S_5$ and $S_6$ being unity). The maximum gain is thus 10.23. In fact, the effect of switching the transistors is to vary the transmissivity of the ladder network. Bipolar transistors may be used in place of field effect transistors. Against the advantage of the zero offset voltage of the field effect transistors must be set the disadvantage of their higher ON resistance. This is of the order of three hundred ohms and is variable from transistor to transistor: allowance for this resistance must be in the design of the ladder network, and the variability may require adjustments to the resistance values in the more significant stages of the ladder network. To obtain a high operating speed, a mid-series characteristic impedance of 2K has been used, and this requires the ladder network to be fed by a buffer amplifier 22a. This is also required to present a very high impedance to any one of the capacitive stores 10, 11, 13 and 14 when it is connected thereto by the input switch 3, through one of the circulating paths 2. The output of these two amplifiers in series is in antiphase to the input, and they are followed by a unity gain inverting stage 22b to restore polarity. This last stage may optionally be bypassed, under the control of the third modifier bit, to given an overall negative gain. The bypassing is effected by field effect transistor switches 61 and 62 by a signal from memory 6 on line 63 or 64. All three of these amplifiers 22, 22a and 22b are monolithic, and the choice of type is dictated by the need for a high value of output slew rate, $dvo/dt$. The operating range of the computation system is limited by the multiplexor switches 3 and 9 to ± 5 volts. Monolithic amplifiers with slew rates better than 4 volts/microsecond are available, and the setting time at the beginning of an instruction is less than three microseconds for the maximum possible voltage excursion (± 10 volts). This is more than adequate for the allowable 10 microsecond settling time.

Figure 4:
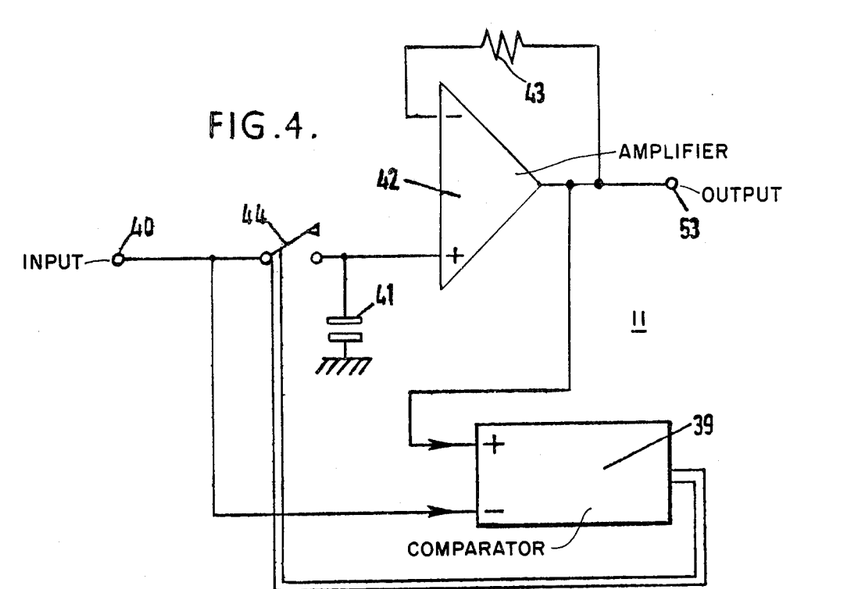
FIG. 4 is a block digram of a maximization store forming one of the output stores of the system of FIG. 1.

The maximization or "greatest-of" store 11 is illustrated in FIG. 4, and comprises a comparator 39, input 40, storage capacitor 41, operational amplifier 42, negative feedback resistance 43, switch 44 (controlled by comparator 39), and output 53, arranged as shown. Although the switch 44 is shown as a mechanical switch, it is illustratively a field effect transistor. The gain of the amplifier 42 with negative feedback resistance 43 is unity.

In use, if it is required to compute "greatest of $x_1, x_2, \ldots x_n$", a first time slot is devoted to setting the charge on capacitor 41 to the lowest possible value, −5 volts, using the fourth modifier bit as described above. In successive subsequent time slots, $x_1, x_2, \ldots x_{n-1}$ and $x_n$ respectively are applied to input 40. If input $x_1$ is greater than −5 volts, switch 44 closes and capacitor charges up to $x_1$. If any subsequent input $x_p$, ($p = 2,3, \ldots n,$) is greater than each previous input $x_{p-1}, x_{p-2}, \ldots x_1$, switch 44 again closes and charges capacitor 41 up to $x_p$.

The comparator 39 has a strobe input, not shown, so that an output is only applied to switch 44 in the second half of each time slot, to avoid erroneous operation due to transient in the first half of each time slot.

Figures 5, 6:
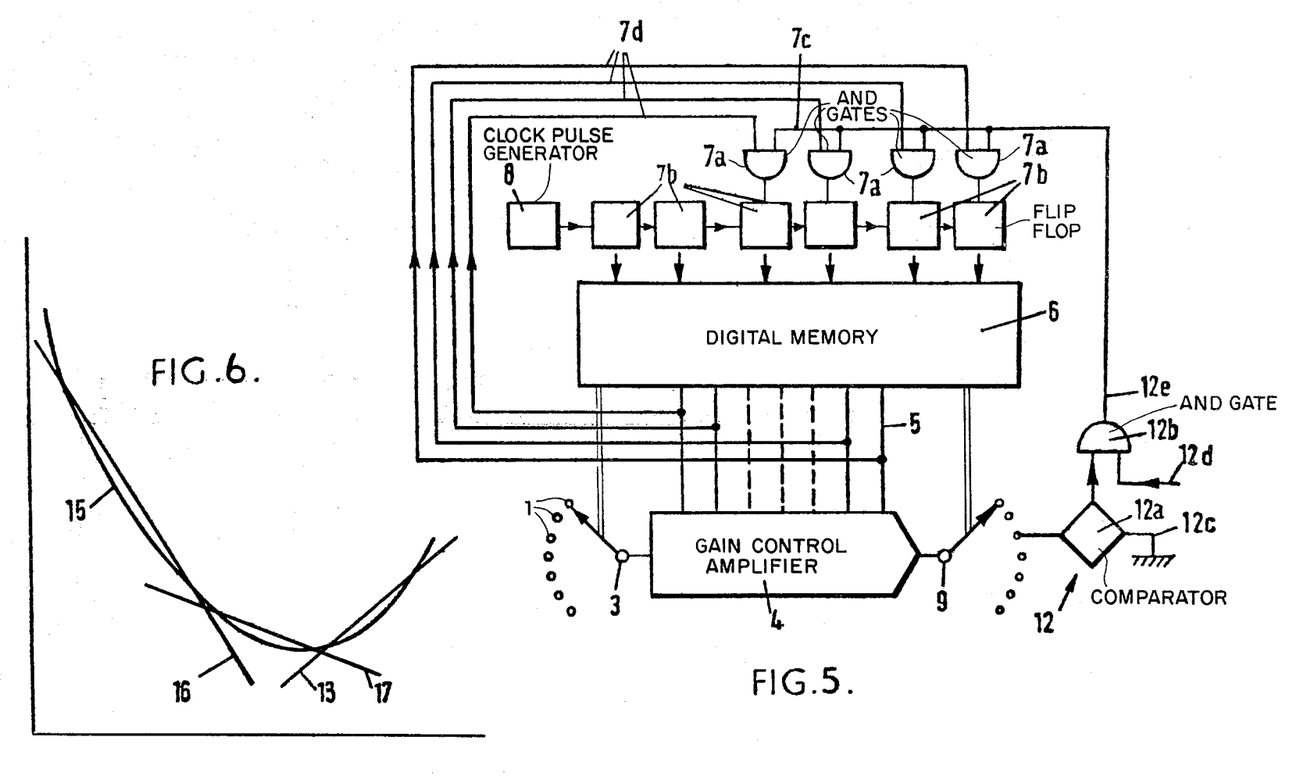
FIG. 5 is a block diagram of part of the system of FIG. 1, showing the operation of a jump circuit.
FIG. 6 illustrates one way of generating an approximation to a curve function.

The "jump" circuit 12 is illustrated diagrammatically in FIG. 5, in which certain other components of the computation system are also shown. More particularly, FIG. 5 shows inputs 1, selector switches 3 and 9, amplifier 4, paths 5, memory 6 and elements 7a, 7b of register 7.

The "jump" circuit 12 comprises a comparator device 12a and an AND gate 12b. The comparator 12a is designed in known manner to provide an output to the AND gate 12b whenever the input to the comparator 12a from switch 9 is greater than zero, (the comparator 12a having a connection to earth at 12c to determine zero potential). A device (not shown) which is driven by the clock 8 provides a second input at 12d to the AND gate 12b during the second half of each time slot, so that the AND gate 12b only provides an output at 12e of the comparator 12a is producing an output during the second half of each time slot. The jump circuit 12 is thus insensitive to transients which are liable to occur in the first half of each time slot.

The seven elements 7a of register 7 are AND gates, each having one input 7c connected to the output 12e from AND gate 12b. The AND gates 7a also each have a second input 7d connected to a respective output path 5 of memory 6. Thus, the memory 6 may be programmed to "prime" a selected one or selected ones of the seven AND gates 7a so that an output at 12e from the AND gate 12b produces an output only from the selected AND gate or gates 7a (to the corresponding element or elements 7b).

The binary number represented by the primed gates 7a is the number output of the register 7. Since the output paths 5 normally determine the gain of amplifier 4, an instruction word in which the jump circuit 12 is to be used is always written so that the input address is zero, (to provide zero input to the amplifier 4,) and so that the seven most significant gain-determining bits of the conditional jump instruction word represent the binary output from register 7 and hence the desired instruction address in the memory 6.

FIG. 6 shows how a known non-linear function represented by the line 15 may be approximated by three linear functions, represented by the lines 16, 17 and 18. The operational amplifier 4 (as shown in FIG. 1) might be operated according to the function 15. The digital programme from the memory 6, therefore, controls the gain of the amplifier to produce the three linear functions 16, 17 and 18.

A less restrictive type of curve generation can be provided by using the programme jump facility as illustrated with reference to FIG. 5.

This system avoids the major disadvantages of both purely analogue systems and purely digital systems. In particular flexibility is maintained and major changes in data or data format or even the basic computational method can be accommodated by a change of the read only memory 6 which defines the programme.

One application of the above-described system is to an indicator system for determining and indicating rated engine pressure ratio (EPR) of a gas turbine engine. Such an indicator system comprises a control panel, (now shown), from which the power mode is selected, an indicator (not shown) providing a digital indication of total air temperature and rated engine pressure ratio, and the above-described computation system. The indicator may be either digital or analogue. As the output signals from the computation system are in analogue form, there is need to provide an analogue to digital converter, if the indicator is digital.

The input signals comprise Flight Mach. No $M_o$, Ram Air Temperature $T_{T2}$ and Altitude H, together with Power Mode and Bleed Mode. These retain their analogue form, but the computation performed on them, as detailed above, is entirely determined by the programme, including the shape of the empirical functions.

I claim:

1. A computational system comprising:

a digital memory for storing a number of digital instruction words, each represented by a plurality of bits, said plurality of bits including a first group thereof for providing an analogue signal selection signal, a second group thereof for providing a function determining signal, and a third group thereof for providing a store selection signal, said digital memory having an input address line for each instruction word and an output line for each bit of the instruction word;

control means for addressing one at a time said input lines of said memory for causing a selected one of said instruction words each to appear on the output lines for a short time period whose duration is determined by said control means;

a plurality of inputs each for receiving a respective analogue input signal whose value is substantially constant during said short time period;

input signal selection means connected to receive said first group of bits from said memory for selecting one of said input signals for said short time period;

analogue computing means connected to receive said second group of bits and for producing an analogue output signal which is a selected analogue function of the selected input signal applied to a first input of said analogue computing means from said signal selection means, said computing means providing a substantially constant analogue output;

a plurality of stores connected to receive the output of said analogue computing means for storing said output signal;

store selection means connected to receive said third group of said bits for selecting one of said stores during the short time period such that the substantially constant analogue output of said computing means is applied to said selected store during said short time period; and at least one closed loop path from an output of one of said stores to one of said inputs.

2. A computational system as claimed in claim 1 further including a plurality of AND gates each having first and second inputs, each of the memory output lines for providing said second group of bits, also being connected to said first input of a corresponding AND gate, said output of each of said AND gates being connected to said control means, said computational system including a comparator selectively connectible through said store selection means to the output of said computing means for comparing said computing means output with a reference value, the output of said comparator being connected to said second input of each AND gate, whereby the outputs of said AND gates form a binary number in accordance with the output of said comparator, said control means being responsive to the outputs of said AND gates for providing an instruction word to said computing means corresponding to said binary number.

3. A computational system as claimed in claim 1 wherein said plurality of bits includes a fourth group of bits for providing a modifier bit control signal, said computing means comprises a variable gain amplifier circuit, said amplifier circuit comprising an operational amplifier, a negative feedback resistance connected thereto, an impedance ladder network connected to an input of said operational amplifier with transistor switches selectively controllable by said function determining signal from said digital memory to vary the transmissivity of said network, a buffer amplifier responsive to the output of said input signal selection means for providing an output to said impedance network, a phase-inverting amplifier connected to the output of said operational amplifier, and switch means selectively controllable by said modifier bit control signal from said digital memory to cause the output of said operational amplifier to bypass said phaseinverting amplifier.

4. A computational system as claimed in claim 1 wherein said plurality of bits includes a fourth group of bits for providing modifier bit control signals, said analogue computing means includes analogue mulitplier means including first and second inputs for multiplying two analogue values applied to said first and second inputs, said computational system also comprising first means for applying an output of onee of said stores representing one of said two analogue values at said first input of said multiplier means in response to a first modifier bit control signal from said digital memory, and second means for applying the content of another of said output stores representing the other of said two analogue values to said multiplier means in response to a second modifier bit control signal from said digital memory.

5. A computational system as set forth in claim 4 further including switch means connected to an output line and responsive to a third modifier bit control signal for switching the output of said multiplier means through said store selection means to a selected store.

6. A computational system as claimed in claim 1, wherein said plurality of bits includes a fourth group thereof for providing modifier bit control signals, said analogue computing means comprising a second input terminal, said computational system further comprising a switch responsive to the modifier bit control signal derived from said digital memory for coupling the output of one of said stores to said second input terminal of said analogue computing means during a first short time period, said computing means further operative in response to said function determining signal to add during a second short time period the output of said one store to an input signal applied to said first input terminal from said switch selection means.

7. A computational system comprising:

a digital memory for storing a number of digital instruction words, each represented by a plurality of bits, said plurality of bits including a first group thereof for providing an analogue signal selection signal, a second group thereof for providing a function determining signal, a third group thereof for providing a store selection signal, and a fourth group thereof for providing a modifier bit control signal, said digital memory having an input address line for each instruction word and an output line for each bit of the instruction word;

control means for addressing one at a time said input lines of said digital memory for causing a selected one of said instruction words each to appear on the output lines for a short period whose duration is determined by said control means;

a plurality of inputs, each for receiving a responsive analogue input signal whose value is substantially constant during said short time period;

input signal selection means connected to receive said first group of bits from said memory for selecting one of said input signals for said short time period;

analogue computing means connected to receive said second group of bits for producing an analogue output signal which is a selected analogue function of the selected input signal applied to a first input of said analogue computing means from said signal selection means, said analogue computing means providing a substantially constant analogue output, said analogue computing means including a variable gain amplifier circuit, said variable gain amplifier circuit comprising an operational amplifier, a negative feedback resistance connected thereto, an impedance ladder network connected to an input of said operational amplifier with transistor switdhes selectively controllable by said function determining signal from said digital memory to vary the transmissivity of said network, a buffer amplifier responsive to the output of said input signal selection means for providing an output to said impedance network, a phase-inverting amplifier connected to the output of said operational amplifier, and switch means selectively controllable by said modifier bit control signal from said digital memory to cause the output of said operational amplifier to bypass said phase-inverting amplifier.

* * * * *

UNITED STATES PATENT OFFICE
CERTIFICATE OF CORRECTION

PATENT NO. : 3,898,625
DATED : August 5, 1975
INVENTOR(S) : RALPH JAMES LAMDEN

It is certified that error appears in the above-identified patent and that said Letters Patent are hereby corrected as shown below:

Not shown:

[73] Assignee: Ultra Electronics Limited,
Buckinghamshire, England

Signed and Sealed this eleventh Day of May 1976

[SEAL]

Attest:

RUTH C. MASON
Attesting Officer

C. MARSHALL DANN
Commissioner of Patents and Trademarks